(12) United States Patent
Huang et al.

(10) Patent No.: US 8,544,320 B2
(45) Date of Patent: Oct. 1, 2013

(54) INTEGRATED MICROMACHINED WIND AND GAS VELOCITY PROFILER

(75) Inventors: Liji Huang, San Jose, CA (US); Jialuo Jack Xuan, Hayward, CA (US); Chih-Chang Chen, Cupertino, CA (US)

(73) Assignee: Siargo Ltd., Santa Clara, CA (US)

( * ) Notice: Subject to any disclaimer, the term of this patent is extended or adjusted under 35 U.S.C. 154(b) by 296 days.

(21) Appl. No.: 12/782,521

(22) Filed: May 18, 2010

(65) Prior Publication Data

US 2011/0283811 A1     Nov. 24, 2011

(51) Int. Cl.
*G01F 1/68* (2006.01)

(52) U.S. Cl.
USPC .................................. 73/204.22; 73/170.01

(58) Field of Classification Search
None
See application file for complete search history.

(56) References Cited

U.S. PATENT DOCUMENTS

| | | | |
|---|---|---|---|
| 4,833,917 A * | 5/1989 | Wilson | 73/170.14 |
| 6,526,823 B2 * | 3/2003 | Tai et al. | 73/204.26 |
| 6,666,081 B1 * | 12/2003 | Babinsky et al. | 73/170.01 |
| 6,845,658 B2 * | 1/2005 | Roberge et al. | 73/170.01 |
| 7,036,367 B2 * | 5/2006 | Golan | 73/204.11 |
| 7,392,710 B1 * | 7/2008 | Ben-Mansour et al. | 73/861.47 |
| 7,461,548 B2 * | 12/2008 | Toulmay | 73/170.02 |
| 7,949,481 B2 * | 5/2011 | Poulos et al. | 702/41 |
| 2008/0271525 A1 * | 11/2008 | Wang et al. | 73/204.25 |
| 2011/0283812 A1 * | 11/2011 | Huang et al. | 73/861.64 |
| 2012/0011940 A1 * | 1/2012 | Huang et al. | 73/861.08 |

* cited by examiner

*Primary Examiner* — Harshad R Patel

(57) ABSTRACT

A wind or gas velocity profiler integrated with micromachined (a.k.a. MEMS, Micro Electro Mechanical Systems) silicon sensors in an open or enclosed space is disclosed in the present invention. There are three main embodiments disclosed in the present invention. Through the preambles of the independent claims, the advantages and merits of such measurement apparatus with MEMS flow sensor will be demonstrated as well. A silicon-based MEMS flow sensor can greatly reduce the sensor fabrication cost by a batch production. The integration with MEMS flow sensor makes the invented anemometer operate in the ways of better measurement accuracy, lower power consumption, higher reliability and a compact dimension compared to traditional anemometers such as cup anemometer, thermal anemometer and ultrasonic anemometer.

6 Claims, 3 Drawing Sheets

INTEGRATED MICROMACHINED WIND AND GAS VELOCITY PROFILER

Figure 1:
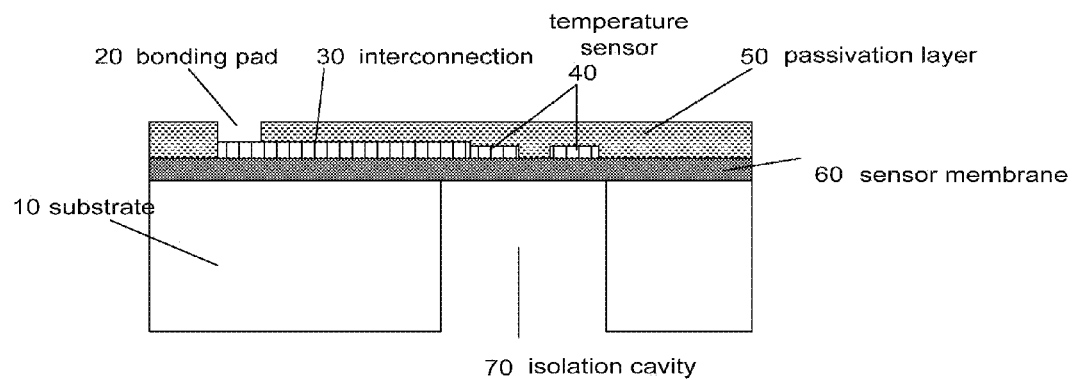

The embodiments of present invention is based on the provisional patent application (U.S. 61/220,274) filed on Jun. 25, 2009. This invention relates to an apparatus which is integrated with a silicon-based Micro-Electro-Mechanical System (MEMS) flow sensor for wind or gas velocity profile measurement in an open or enclosed space.

FIELD OF THE INVENTION

The current invention relates to general purposes for measuring wind velocity as well as the velocity profile in an open space of various environments and occasions such as industrial manufacture chambers, cabinet air profile, process environmental monitoring, weather station, ship, and river or ocean exploring activities etc. Furthermore, due to the merits of compact dimension and high accuracy of MEMS flow sensor, the invented apparatus can as well apply to optimize the operation efficiency of a wind power or solar power generator.

BACKGROUND OF THE INVENTION

Current approaches of wind or gas flow velocity in an open space or gas flow in an enclosed chamber velocity distribution rely on three major anemometers: cup anemometer, thermal anemometer and ultrasonic anemometer. Cup anemometers can provide the average velocity and usually is bulky in size and can be affected by the gas density, for instance. Thermal anemometers are density independent but easy to fail due to its fragility, and they again usually can only be used for average wind or gas velocity as well. Sonic anemometers can provide wind or gas profile in an open space but they are usually expensive and require wind tunnel calibration. The profile measured by the sonic anemometers is also easy to be distorted due to the local variation of the environments that may not be predicated by simulated wind tunnel conditions. They are also too bulky in size.

Profile of wind or gas velocity in an open or enclosed space is much demanded for controlling a device accurately that shall be operated in such an environment where wind or gas velocity would be the major source of disturbance. The knowledge of this profile will then enhance the precise control of the device by minimizing the disturbance. For example, an enclosed process chamber that relies on the gas flow to generate plasmas will need the understanding of chamber flow velocity distribution (profile) to optimize the process efficiency. In a wind power generator, accurate measurement of the wind velocity profile would be critical to power generation efficiency; the same applied to the solar power with a sun tracker which performance would much affected by the wind/air flow velocity around it.

The current invention using the Micro-Electro-Mechanical System (MEMS) mass flow sensor to configure into a new wind or gas open space anemometer for measuring the desired wind or gas velocity profile in the interested space would therefore can have many advantages over the current existing technologies.

SUMMARY OF THE INVENTION

The invention is for a wind velocity profiler consisted of multiple MEMS mass flow sensors that are packaged 360° around a central axis, that can be used to obtain the instant wind profile in an open space or a confined space for informative or control in a process or for an operation for which the wind or gas instant profile will assist precise control in the said process or enhance accuracy for the said operation. More specifically it can be applied to any applications requiring measurement of wind or any gas flow in an open space or confined space where 2 or even 3-dimensional of such profile would benefit the followed actions. The invented wind or gas velocity profiler with multiple MEMS flow sensors containing freestanding membranes, cavities, micro channels and/or multi-layered structures. These sensors are packaged in individual flow channels, each of which is further connected so that the desired direction of wind or gas velocity can be recorded. The data of such velocity measured in each individual channel are then scanned and collected by a micro controller unit (MCU) that would finally output the actual instant profile of the said measurements. This invention also effectively solves the current limitation of an anemometer or wind meter that can usually measure single direction of the wind or gas flow velocity with a slow response time. Some of the existing wind meters in mechanical type further suffer the accuracy loss via the mechanical to electronic signal conversion. The MEMS sensors in this invention can be manufactured using a CMOS (complimentary metal-oxide-semiconductor) compatible process, thereof it provides easy manufacturability and can significantly reduce the cost.

BRIEF DESCRIPTIONS OF THE DRAWINGS

Figure 2:
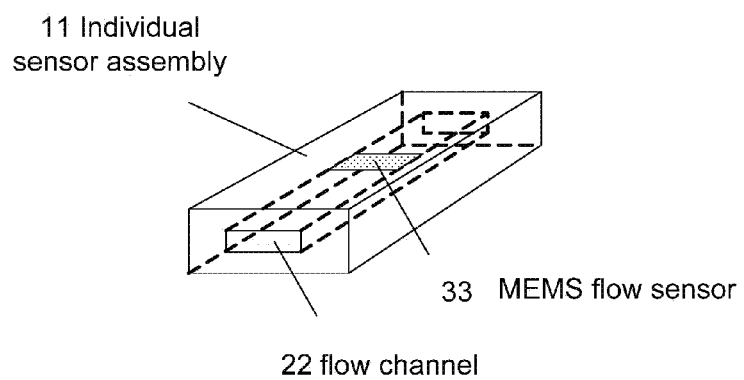
Figure 3:
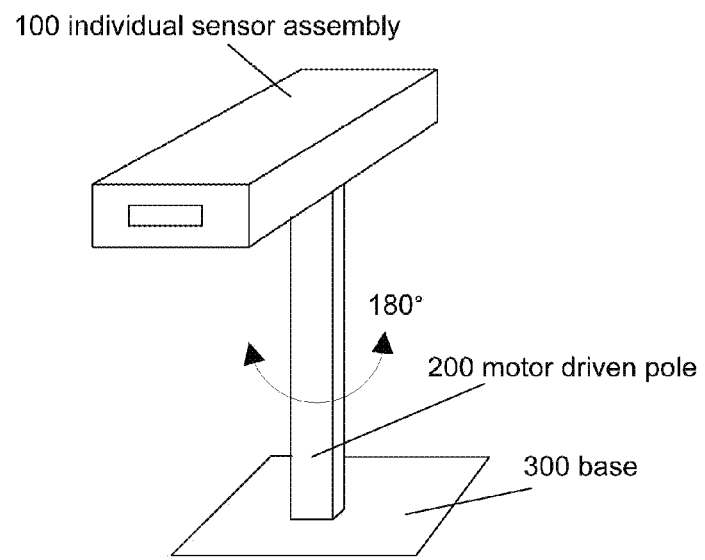
Figure 4:
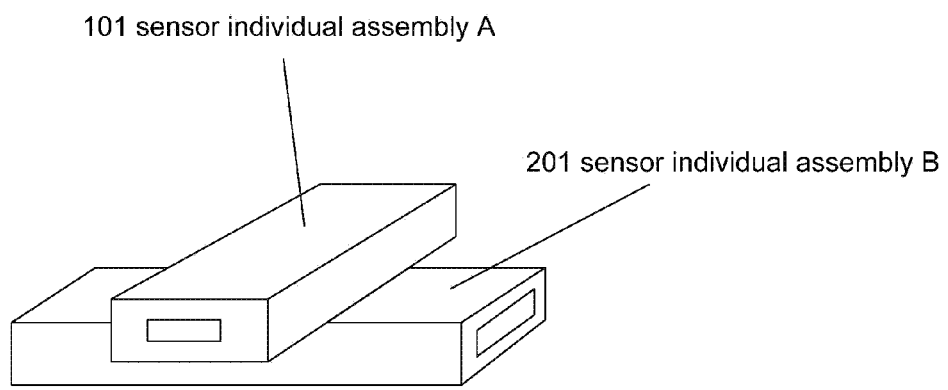
Figure 5:
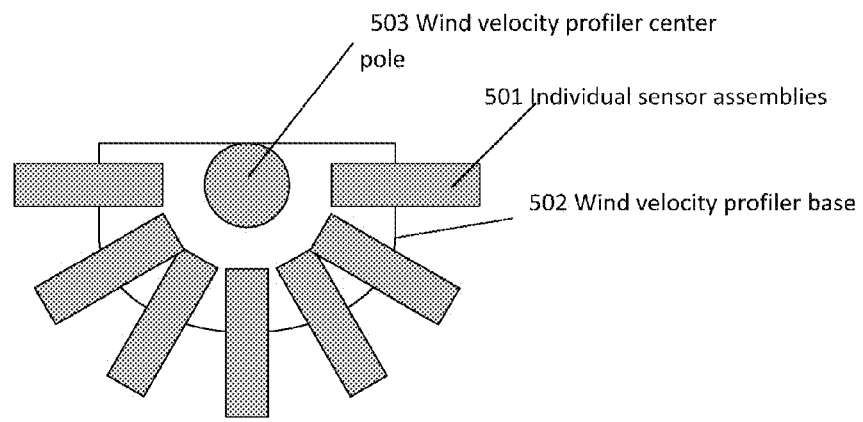
Figure 6:
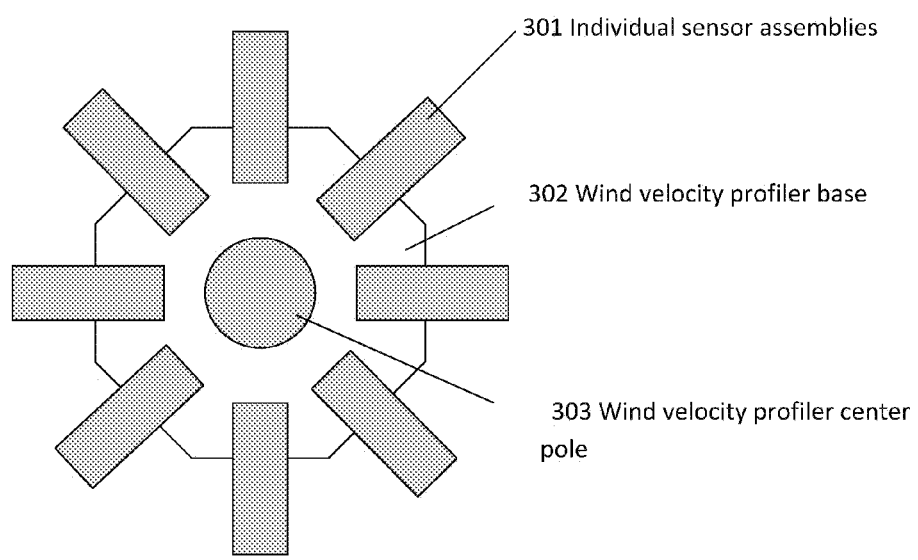

FIG. 1—is a section view illustrating the details of the microelectromechanical systems (MEMS) devices flow sensor FIG. 2—is a prospective view of the individual sensor assembly FIG. 3—is a prospective view illustrating the sensor assembly on a fixed motor-driven pole FIG. 4—is a prospective view illustrating the stacked individual sensor assemblies FIG. 5—is a plain view illustrating a sensor assembly packaged 180° around a central axis FIG. 6—is a plain view illustrating a sensor assembly packaged 360° around a central axis

DETAILED DESCRIPTION OF THE PREFERRED EMBODIMENTS

FIG. 1 depicts the cross section view of the silicon-based MEMS flow sensor. The micromachined MEMS flow sensor has a suspending membrane which is functioned as a thermal isolation diaphragm to support the operation of temperature sensors FIG. 2 illustrates a prospect view of individual sensor assembly 11 that includes flow channel 22 and a flow sensor 33 mounted on side wall of flow channel 22. For the wind or gas velocity, this invention measures the thermal conductivity or thermal capacity of the gas passing through the designated flow channel in which the MEMS mass flow sensor (40 of FIG. 1) is placed for accurate measurement of the said flow velocity in the channel. This individual channel in the configuration shown in FIG. 2 can then be connected to a fixed pole with a driving motor that can turn in 180° as shown in FIG. 3 and the corresponding electronics will then collect the data at the desired angle of turn. The space wind or gas velocity can then be recorded and reconstructed to reveal the profile of the said wind or gas.

In another embodiments of configurations shown by FIG. 4, each of the individual flow assembly can be stacked over and oriented at the desired directions so that the wind or gas velocity in each channel can simultaneously record of the said velocity that can be further processed via a micro controller into the wind or gas velocity profile in the desired space directions.

In the embodiment of FIG. 5, the wind velocity profiler is composed by 7 individual sensor assemblies which are displaced in a half circle around the center pole equally between each other by 30 degrees of division. Each cycle of measurement will include two steps of operation. The first step of the operation will perform the incoming wind measurement on the first half circle (180 degrees of range), and then the center pole of profiler will rotate 180 degrees to complete the flow measurement on the other half circle (another 180 degrees of range). Each collected data from the individual sensor assembly will be transferred to a micro controller to process and calculate the wind or gas velocity profile in different directions.

In the embodiment of FIG. 6, the wind velocity profiler is composed by 8 individual sensor assemblies which are arranged to displace in a whole circle around the center pole equally between each other by 45 degrees of division. Unlike the previous embodiments of invention, the wind or gas velocity profile could be accomplished in a single measurement instantly at any time since the individual sensor assemblies had covered in a whole 360 degrees of range which benefits the efficiency and precision of profile measurement.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

We claim:

1. An integrated micromachined wind and gas velocity profiler comprising:
   a center pole driven by a motor;
   a set of flow sensor components displaced around the center pole;
   a control circuit board for controlling the motor driven pole and collecting and analyzing flow data from each flow sensor components;
   wherein the set of flow sensor components are displaced in a half circle (180 degrees of range) around the center pole equally between each other by certain degrees of division;
   wherein each of the flow sensor components has a flow channel built inside and each flow sensor component including a silicon based Micro Electro Mechanical System (MEMS) flow sensor disposed within the flow channel;
   wherein the center pole driven by a motor provide support and movement of rotation for the set of flow sensor components.

2. The integrated micromachined wind and gas velocity profiler of claim 1 wherein:
   the set of the flow sensor components has a wide dynamic range to measure said wind or gas flow velocity up to 120 meter per second.

3. The integrated micron wind and gas velocity profiler of claim 1 wherein:
   the center pole has a 180 degrees of rotation freedom; wherein each cycle of measurement will include two steps of operation; the first step of the operation will perform the incoming wind measurement on the first half circle (180 degrees of range), and then the center pole of the profiler will rotate 180 degrees to complete the flow measurement on the other half circle (another 180 degrees of range).

4. An integrated micromachined wind and gas velocity profiler comprising:
   a center pole;
   a set of flow sensor components;
   a control circuit board for collecting and analyzing flow data from each flow sensor components;
   wherein the set of flow sensor components are displaced in a full circle (360 degrees of range) around the center pole equally between each other by certain degrees of division;
   wherein each of the flow sensor components has a flow channel built inside and each flow sensor component including a silicon based Micro Electro Mechanical System (MEMS) flow sensor disposed within the flow channel;
   wherein the center pole is in a fixed orientation to support the set of flow sensor components.

5. The integrated micromachined wind and gas velocity profiler of claim 4 wherein:
   the set of the flow sensor components has a wide dynamic range to measure said wind or gas flow velocity up to 120 meter per second.

6. The integrated micromachined wind and gas velocity profiler of claim 4 wherein:
   said wind or gas velocity profile measurement could be accomplished in a single measurement instantly at any time since the individual sensor assemblies had covered in a whole 360 degrees of range which benefits the efficiency and precision of wind or gas velocity profile measurement.

* * * * *